United States Patent
Park

(10) Patent No.: US 12,401,299 B2
(45) Date of Patent: Aug. 26, 2025

(54) MOTOR CONTROL DEVICE AND METHOD

(71) Applicant: HL MANDO Corporation, Pyeongtaek (KR)

(72) Inventor: Jae Sang Park, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 200 days.

(21) Appl. No.: 18/296,563

(22) Filed: Apr. 6, 2023

(65) Prior Publication Data

US 2024/0007027 A1 Jan. 4, 2024

(30) Foreign Application Priority Data

Jul. 4, 2022 (KR) .......................... 10-2022-0081703

(51) Int. Cl.
*H02P 6/10* (2006.01)
*H02P 27/06* (2006.01)

(52) U.S. Cl.
CPC ................ *H02P 6/10* (2013.01); *H02P 27/06* (2013.01)

(58) Field of Classification Search
CPC .... H02P 6/00; H02P 21/00; H02P 8/18; H02P 25/098; H02P 27/06
See application file for complete search history.

(56) References Cited

U.S. PATENT DOCUMENTS

2019/0158004 A1* 5/2019 Pramod ................. B62D 5/0421
2022/0368269 A1* 11/2022 Chen ..................... H02P 29/028

* cited by examiner

*Primary Examiner* — Said Bouziane
(74) *Attorney, Agent, or Firm* — Harvest IP Law, LLP

(57) ABSTRACT

The embodiment relates to a motor control device and method and provide a motor control device and method capable of compensating for torque ripples generated due to the manufacturing variation in the motor. In particular, there may be provided a motor control device and method capable of compensating for torque ripple by applying a compensation factor calculated from torque ripple information measured in a state in which three phases of the motor is electrically shorted to control current based on the torque ripple-compensated target torque.

16 Claims, 7 Drawing Sheets

MOTOR CONTROL DEVICE AND METHOD

CROSS-REFERENCE TO RELATED APPLICATION

This application claims priority from Korean Patent Application No. 10-2022-0081703, filed on Jul. 4, 2022, which is hereby incorporated by reference for all purposes as if fully set forth herein.

BACKGROUND

Field

The present embodiments relate to a motor control device and method.

Description of Related Art

With recent increasing demand for safety and convenience and eco-friendly finished vehicles, the mechanical system and hydraulic system constituting the vehicle are being replaced with an electrical system. The electric system which replaces the conventional hydraulic system adopts a motor as the load device and uses mechanical torque generated from the motor. Some issues, such as torque ripples, may ensue in such an electric system requiring enhanced performance. In particular, torque ripples in the steering system may deteriorate the driver's steering feel.

The steering system adopting a permanent magnet synchronous motor (PMSM) compensates for the torque ripple due to the manufacturing variation by applying numerical analysis as well as tuning while flowing current to the actual product. However, such numerical analysis and tuning typically works only for compensation for the representative sample or design indicators. Applying a test and tuning for each motor in the production line takes long, increasing manufacturing costs.

Therefore, a need arises for a torque ripple compensation technique capable of minimizing the time consumption in the production line while reflecting the manufacturing variation for each motor.

BRIEF SUMMARY

In the foregoing background, the present embodiments may provide a motor control device and method capable of compensating for torque ripples generated due to the manufacturing variation in the motor.

In an aspect, the present embodiments may provide a motor control device comprising a current calculator calculating an input current based on a torque ripple-compensated target torque of a motor using a compensation factor according to a torque component current ($I_q$) and a current controller generating a control signal corresponding to the input current and inputting the control signal to the motor, wherein the target torque is determined by applying the compensation factor calculated from torque ripple information measured in a state in which each phase of the motor is electrically shorted.

In another aspect, the present embodiments may provide a motor control method comprising a current calculation step calculating an input current based on a torque ripple-compensated target torque of a motor using a compensation factor according to a torque component current ($I_q$) and a current control step generating a control signal corresponding to the input current and inputting the control signal to the motor, wherein the target torque is determined by applying the compensation factor calculated from torque ripple information measured in a state in which each phase of the motor is electrically shorted.

According to the present embodiments, there may be provided a motor control device and method capable of compensating for torque ripples generated due to the manufacturing variation in the motor.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
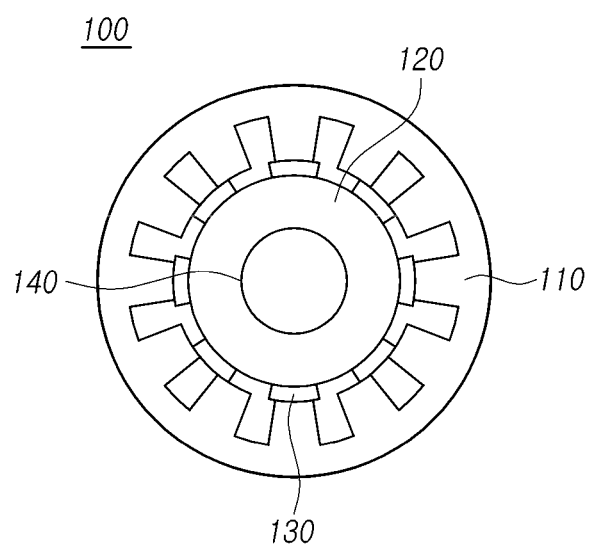
FIG. 1 is a view exemplarily illustrating a shape of a permanent magnet synchronous motor (PMSM) according to an embodiment of the disclosure.

The disclosure relates to a motor control device and method.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Motors in the disclosure may be classified into brushless DC motors (BLDCM) and permanent magnet synchronous motors (PMSM, BLAC) according to the control method for counter electromotive force and armature current. For example, the permanent magnet synchronous motor may be a BLDC that applies a square wave current to a flat part of the counter electromotive force with a trapezoidal counter electromotive force and a permanent magnet synchronous motor (PMSM) that applies a sine wave current with a sine-wave counter electromotive force. In the disclosure, a PMSM is described as an example, but the disclosure is not limited thereto.

FIG. 1 is a view exemplarily illustrating a shape of a permanent magnet synchronous motor (PMSM) according to an embodiment of the disclosure.

Referring to FIG. 1, the shape of the permanent magnet synchronous motor according to an embodiment of the disclosure may be a 8-pole, 12-slot structure. For example, the motor 100 is supplied with driving force by electricity, and may include a stator 110 and a rotor 120. For example, the stator 110 may be received inside a housing and assembled by arranging a plurality of slots in an annular shape. Specifically, the rotor 120 is rotatably positioned inside the stator 110, and the drive shaft 140 is coupled to the center of the stator 110, and a plurality of permanent magnets 130 may be spaced apart from each other along the outer edge in the circumferential direction. Further, in the motor 100, eight permanent magnets 130 may be spaced apart with N poles and S poles alternately arranged along the outer edge in the circumferential direction of the rotator 120, and the stator 110 may have an 8-pole, 12-slot structure in which 12 slots are arrayed and assembled in an annular shape. However, the 8-pole, 12-slot structure is merely an example, and embodiments of the disclosure are not limited thereto.

For example, a combination of the number of poles and the number of slots of the motor 100 may be determined in an initial design stage according to the purpose of use and the driving method. For example, counter electromotive force, which is one of the most important parameters in motor design, may be a factor that greatly affects the output and performance of the motor 100. Assuming that the motor 100 has the same number of conductors and the same volume of permanent magnets, the counter electromotive force may have different values depending on combinations of the number of poles and the number of slots. In the motor 100, a manufacturing variation may occur during mass production, causing errors in counter electromotive force and torque ripple due to changes in stator resistance or fluctuations. Accordingly, most of mass-produced motors currently adopt methods for applying numerical analysis or tuning while flowing a current to the actual product to address such issues. However, the method for applying numerical analysis may not reflect the manufacturing variation due to errors from the difference from analysis and the actual product. The method for applying tuning to actual products may increase manufacturing costs due to an increased time in the manufacturing process.

Specifically, most of 8-pole, 12-slot motors are most affected by the design factors when 24th or 48th torque ripple occurs, and the torque ripple may be compensated by the representative sample or numerical analysis. However, when the 8th torque ripple occurs, each product has different characteristics due to various factors, such as the manufacturing variation of the motor stator, the resistance imbalance of the coil, and variation in current sensor, so that application of the representative sample or numerical analysis cannot compensate for the torque ripple. In this case, the motor may require a method for minimizing the time consumed in the production line while reflecting the manufacturing variation to compensate for torque ripple.

Figure 2:
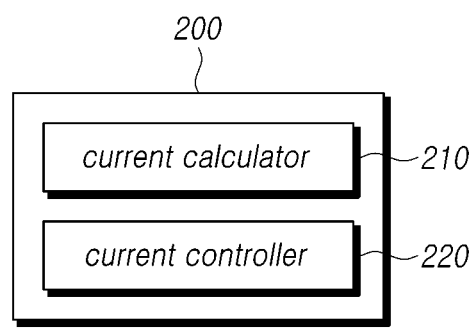
FIG. 2 is a view illustrating a configuration of a motor control device according to an embodiment of the disclosure.

FIG. 2 is a view illustrating a configuration of a motor control device according to an embodiment of the disclosure.

Referring to FIG. 2, a motor control device 200 according to an embodiment of the disclosure may include a current calculator 210 and a current controller 220. As an example, the motor control device 200 may include a current calculator 210 calculating an input current based on a target torque compensated for the torque ripple of the motor using a compensation factor according to a torque component current $I_q$ and a current control unit 220 generating a control signal corresponding to the input current and inputting it to the motor. In this case, the target torque may be determined by applying the compensation factor calculated from torque ripple information measured in a state in which each phase of the motor is electrically shorted. In other words, the current calculator 210 may calculate the input current based on the target torque to which the compensation factor is applied according to the torque component current $I_q$ so that the motor generates a target torque compensated for the torque ripple. Further, as an example, the motor may be a three-phase motor, and the target torque may be determined by applying the compensation factor calculated from the torque ripple information measured in a state in which the three phases of the motor are electrically shorted. Hereinafter, a three-phase motor is described, but the disclosure is not limited.

The current calculator 210 of the motor control device 200 according to an embodiment may calculate a target torque to which the compensation factor according to the torque component current $I_q$ is applied. Specifically, the motor control device 200 may produce the target torque based on steering information received from at least one sensor among a steering angle sensor and a torque sensor. Further, the motor control device 200 may convert the target torque into a target current. The conversion into current may adopt a producing method generally used in the art. Accordingly, the motor control device 200 may produce a reference target torque based on steering information and produce the target torque to which the compensation factor for torque ripple is applied, as the final target torque based on the reference target torque and current map.

As an example, the current calculator 210 may calculate the input current based on the target torque to which the compensation factor is applied according to the torque component current $I_q$ so that the motor generates a target torque compensated for the torque ripple. For example, the compensation factor may be calculated from the torque ripple information measured in a state in which the three phases of the motor are electrically shorted, and the calculated compensation factor may determine the target torque compensated for the torque ripple. Further, the torque ripple information may be information regarding the torque ripple of the motor measured for each motor speed in a state in which the upper switching element or lower switching element of the inverter connected to each phase of the motor is simultaneously turned on. Accordingly, the current calculator 210 may measure only the torque ripple information reflecting the electrical characteristics of the motor by measuring the torque ripple in a state in which the three phases of the motor are electrically shorted.

As another example, the compensation factor may be produced from a current map according to the torque component current $I_q$ generated based on the torque ripple information. For example, the current map may be preset and stored. Further, the current map may be created by matching, per torque component current, the phase information and magnitude information extracted from the torque ripple information according to the motor angle or the torque ripple information according to the measured time. Specifically, the compensation factor may be a counter electromotive force constant calculated for each torque component current using the phase information and magnitude information selected based on the current map. However, if the phase information and the magnitude information are determined not to influence the torque component current, the compensation factor may be set to have a constant value regardless of the torque component current.

For example, the phase information and the magnitude information may be extracted from the characteristic value of a specific frequency component and torque ripple order information for the torque ripple calculated according to a Fourier transform on the torque ripple information. Further, the current map may include the phase information and magnitude information extracted from the characteristic value of the specific frequency component and torque ripple order information for the torque ripple by performing a Fourier transform on the torque ripple information. Here, the specific frequency component may be determined using the ratio of motor speed to fundamental frequency information and the order information when the torque ripple information is torque ripple information according to time.

The current control unit 220 of the motor control device 200 according to an embodiment may generate a control signal corresponding to the input current calculated based on the target torque and input it to the motor. As an example, the current calculator 210 may generate a control signal corresponding to the input current calculated based on the target torque to which the compensation factor according to the torque component current $I_q$ is applied and input the torque ripple-compensated current to the motor. Then, the motor may output a torque ripple-compensated current. Accordingly, the motor control device 200 may calculate an input current based on the torque ripple-compensated target torque, thereby providing an effect of easily compensating for torque ripple.

Figure 3:
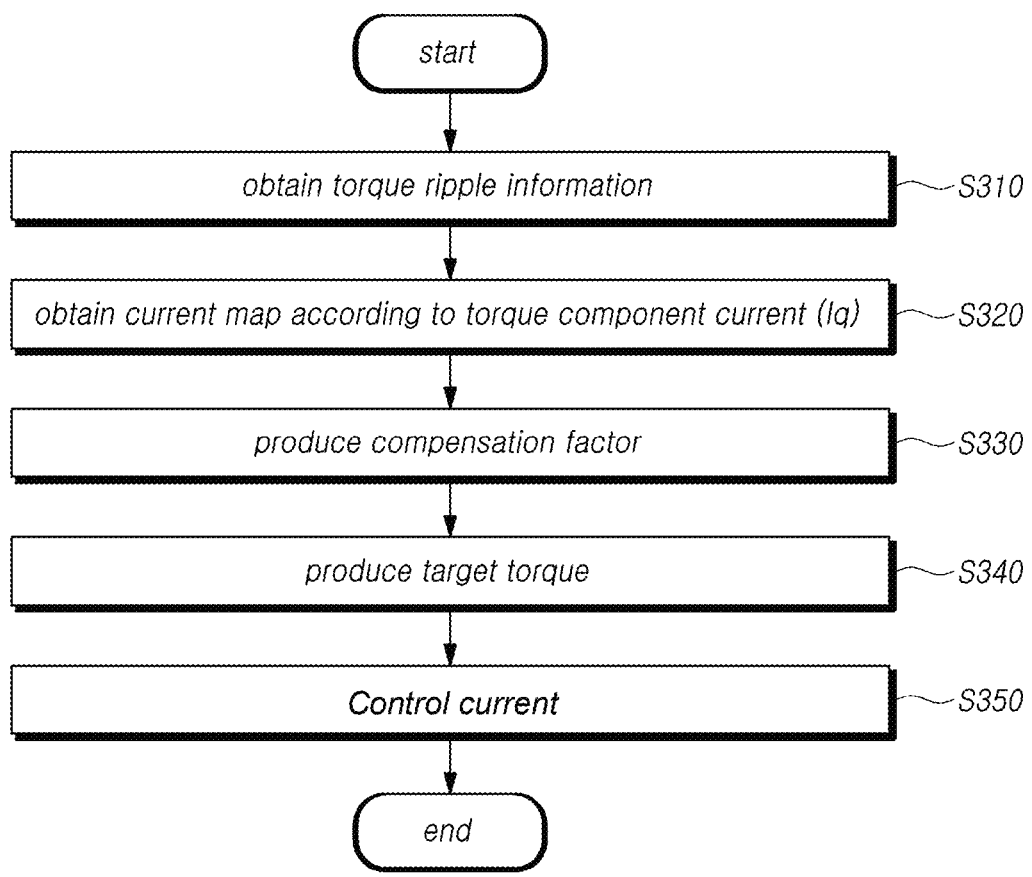
FIG. 3 is a flowchart illustrating operations of components of a motor control device according to an embodiment of the disclosure.

FIG. 3 is a flowchart illustrating operations of components of a motor control device according to an embodiment of the disclosure.

An example of the operation of controlling the motor based on torque ripple-compensated target torque by the motor control device 200 according to an embodiment of the disclosure is described with reference to FIG. 3. As an example, the motor control device 200 may obtain torque ripple information by the electrical characteristics of the motor. For example, the motor control device 200 may obtain information regarding the torque ripple of the motor measured for each motor speed (e.g., 100, 200, or 300 rpm) in a state in which the three phases of the motor are electrically shorted. Here, the torque ripple information measured for each motor speed may be torque ripple information for each torque component current. Specifically, the state in which the three phases of the motor are electrically shorted may be a state in which the upper switching element or lower switching element of the inverter connected to each phase of the motor is simultaneously turned on. Or, the state may be a state in which the respective terminals of the phases are connected to each other.

As an example, the motor control device 200 may obtain a current map according to the torque component current generated from the torque ripple information (S320). For example, the motor control device 200 may obtain the current map that is created by matching, per torque component current, the phase information and magnitude information extracted from the torque ripple information according to the motor angle or the torque ripple information according to the measured time. Here, the current map may be previously created and stored or may be created in real-time.

As another example, the motor control device 200 may obtain the current map that includes the phase information and magnitude information extracted from the characteristic value of the specific frequency component and torque ripple order information for the torque ripple by performing a Fourier transform on the torque ripple information. In other words, the current map may include torque ripple order information, specific frequency component information, phase information, and magnitude information for the torque ripple matched for each torque component current. Here, the specific frequency component may be determined using the ratio of motor speed to fundamental frequency information and the order information when the torque ripple information is torque ripple information according to time.

Specifically, when the torque ripple information is torque ripple information according to time, if the motor speed is 100 rpm, a frequency component corresponding to 40 Hz may be extracted from the 24th torque ripple by performing a Fourier transform on the torque ripple information. The phase information and magnitude information may be obtained by separating the characteristic value of so-extracted frequency component into the integer part and the real part. Or, when the torque ripple information is torque ripple information according to the motor angle, order information may be obtained as a ratio of harmonics order information to revolutions per minute information by performing a Fourier series on the torque ripple information.

As an example, the motor control device 200 may produce a compensation factor from the current map (S330). For example, the motor control device 200 may calculate the counter electromotive force constant for each torque component current using the phase information and magnitude information selected based on the current map to produce the compensation factor. Specifically, the motor control device 200 may calculate the counter electromotive force constant from Equation 1 using the phase information and magnitude information for each torque component current included in the current map. Here, the compensation factor may be the torque ripple-compensated counter electromotive force constant. The compensation factor may be represented as in Equation 1.

$$Ke = Ke_{nominal} + Ke_{ripple} \cdot \sin(\theta + \alpha_{phase})$$ [Equation 1]

Here, $K_{e\_nominal}$ may be the nominal value, $K_{e\_ripple}$ may be magnitude information, θ may be the electrical angle of the motor, and $α_{phase}$ may be the phase information.

In contrast, if the phase information and the magnitude information are determined not to influence the torque component current, the motor control device 200 may set the compensation factor to have a constant value regardless of the torque component current. Specifically, the compensation factor may be the conventional counter electromotive force constant to which torque ripple compensation is not applied.

As an example, the motor control device 200 may calculate a torque ripple-compensated target torque (S340). For example, the motor control device 200 may calculate a target torque to which the compensation factor according to the torque component current $I_q$ is applied. Specifically, the motor control device 200 may calculate the target torque by applying the compensation factor calculated for each torque component current to Equation 2. Equation 2 may be represented as follows.

$$T_q = 1.5 \cdot (Ke + Pole/2 \cdot (L_q - L_d) \cdot I_d) \cdot I_q$$ [Equation 2]

Here, $K_e$ may be the compensation factor calculated with the torque ripple-compensated counter electromotive force constant, Pole may be the number of poles, $L_q$ and $L_d$ may be the d-axis and q-axis inductance, and $I_q$ and $I_d$ may be the d-axis and q-axis currents.

As an example, the motor control device 200 may calculate an input current based on the target torque and control the current of the motor (S350). For example, the motor control device 200 may calculate an input current based on the torque ripple-compensated target torque. The motor control device 200 may generate a control signal corresponding to the calculated input current and input the torque ripple-compensated current to the motor.

Figure 4:
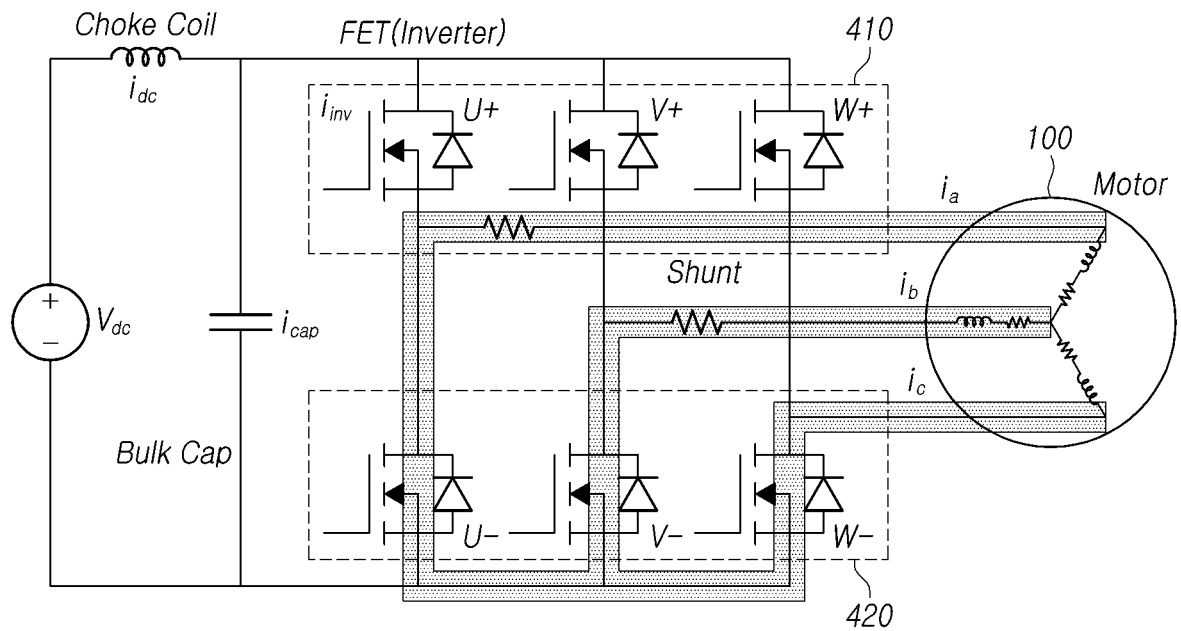
FIGS. 4 and 5 are views illustrating a state in which a torque ripple is measured to create a current map according to an embodiment of the disclosure.

FIG. 4 is a view illustrating a state in which a torque ripple is measured to create a current map according to an embodiment of the disclosure.

An example of a state in which the current calculator 210 of the motor control device 200 according to an embodiment of the disclosure measures torque ripple information for calculating the compensation factor is described with reference to FIG. 4. As an example, the torque ripple-compensated target torque may be determined from the torque ripple information measured in a state in which the three phases of the motor 100 are electrically shorted. For example, the torque ripple information may be information regarding the torque ripple of the motor 100 measured for each motor speed in a state in which the upper switching element or lower switching element of the inverter connected to each phase of the motor 100 is simultaneously turned on. Here, the state in which the three phases of the motor 100 are electrically shorted may be a state in which each phase motor coil of the motor 100 is shorted. Accordingly, it is possible to measure only the torque ripple information reflecting the electrical characteristics of the motor 100 by measuring the torque ripple in a state in which the three phases of the motor 100 are electrically shorted.

Specifically, the inverter may include an inverter circuit including switching elements, e.g., MOSFETs, and a rectifier circuit including a diode connected in parallel with each switching element. The switching elements of the inverter may include use upper switching elements 410 connected to the positive voltage-side circuit unit and lower switching elements 420 connected to the negative voltage-side circuit unit. Two switching elements may be connected in series to each phase (U phase, V phase, and W phase) and may be connected to the motor coil of each phase of the motor 100. For example, the state in which the three phases of the motor 100 are electrically shorted may be a state in which three lower switching elements 420 connected to the respective negative voltage sides of the phases are all turned on, and three upper switching elements 410 connected to the respective positive voltage sides of the phases are all turned off. Or, the state in which the three phases of the motor 100 are electrically shorted may be a state in which each phase motor coil of the motor 100 is shorted by turning on all of the three upper switching elements 410 and turning off all of the three lower switching elements 420. Accordingly, even when the motor is a finished product or is in a completely assembled state, torque ripple information due to the manufacturing variation not reflecting the characteristics by control performance may be measured through simple inverter manipulation.

Figure 5:
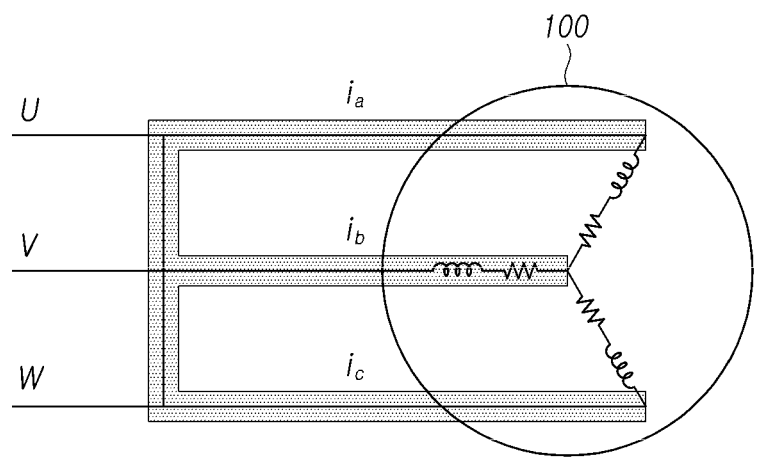

FIG. 5 is a view illustrating a state in which a torque ripple is measured to create a current map according to an embodiment of the disclosure.

Another example of a state in which the current calculator 210 of the motor control device 200 according to an embodiment of the disclosure measures torque ripple information for calculating the compensation factor is described with reference to FIG. 5. As an example, the torque ripple-compensated target torque may be determined from the torque ripple information measured in a state in which the three phases of the motor 100 are electrically shorted. For example, the torque ripple information may be information regarding the torque ripple of the motor 100 measured for each motor speed in a state in which the terminal of each phase of the motor 100 is connected and shorted.

Specifically, each phase terminal of the motor 100 may be shorted by a switching element, e.g., MOSFET. Further, the switching element may be connected between the phases (U phase, V phase, and W phase), and be connected to the motor coil of each phase of the motor 100. For example, the state in which the three phases of the motor 100 are electrically shorted may be a state in which the terminal of each phase is connected to the switching element. However, if the switching elements are all turned on to short each phase of the motor 100, the switching element may operate as if it has an on resistance $R_{ds\_on}$. Therefore, in this case, it is needed to analyze torque ripple information considering the on resistance.

Figure 6:
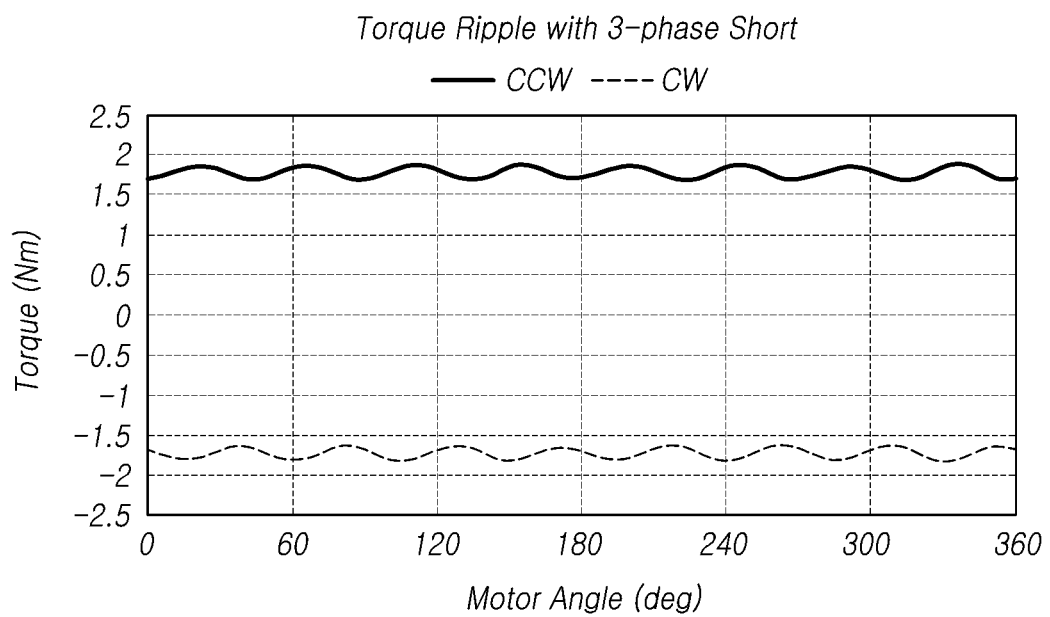
FIG. 6 is a view illustrating a torque ripple measured according to an embodiment of the disclosure.

FIG. 6 is a view illustrating a torque ripple measured according to an embodiment of the disclosure.

An example of torque ripple information according to the motor angle measured according to an embodiment of the disclosure is described with reference to FIG. 6. As an example, the torque ripple information may be information measured for the torque ripple generated for each position of the rotor in the motor 100. For example, in the ideal case, if among the motor parameters, the counter electromotive force constant $K_e$ and the inductance are fundamental frequency, the torque ripple information may be measured only with the torque value of the direct current (DC) component. However, in the case of the actual product, the counter electromotive force constant of the motor has a frequency component according to the manufacturing variation and structural features, so that the torque ripple may be measured together with the torque ripple information. Therefore, as shown in FIG. 6, if the motor has an 8-pole, 12-slot structure, it may be identified that the 8th torque ripple is generated.

A motor control method that may be performed by the motor control device 200 described above in connection with FIGS. 1 to 6 is described below.

Figure 7:
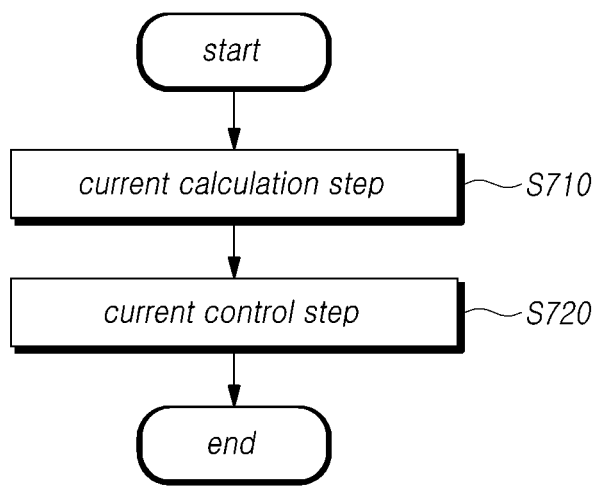
FIG. 7 is a flowchart illustrating a motor control method according to an embodiment of the disclosure.

FIG. 7 is a flowchart illustrating a motor control method according to an embodiment of the disclosure.

Referring to FIG. 7, a motor control method according to an embodiment of the disclosure may include a current calculation step (S710). For example, the motor control device may calculate an input current based on a target torque to which the compensation factor according to the torque component current $I_q$ is applied. As an example, the motor control device may calculate the input current based on the target torque to which the compensation factor is applied according to the torque component current $I_q$ so that the motor generates a target torque compensated for the torque ripple. Specifically, the motor control device may produce a reference target torque based on steering information received from at least one sensor of a steering angle sensor and a torque sensor and produce the target torque to which the compensation factor for torque ripple is applied, as the final target torque based on the reference target torque and current map.

Further as an example, the motor control device may determine the torque ripple-compensated target torque calculated from the torque ripple information measured in a state in which each phase of the motor is electrically shorted. Here, the compensation factor may be calculated from the torque ripple information measured in a state in which each phase of the motor are electrically shorted, and the calculated compensation factor may be applied to determine the target torque compensated for the torque ripple. Further, the torque ripple information may be information regarding the torque ripple of the motor measured for each motor speed in a state in which the upper switching element or lower switching element of the inverter connected to each phase of the motor is simultaneously turned on. In other words, the torque ripple information measured in a state in which the three phases of the motor are electrically shorted may be torque ripple information reflecting the electrical characteristics of the motor.

Further, as an example, the motor control device may produce the compensation factor from a current map according to the torque component current $I_q$ generated based on the torque ripple information. Here, the current map may be created by matching, per torque component current, the phase information and magnitude information extracted from the torque ripple information according to the motor angle or the torque ripple information according to the measured time. Further, the current map may include the phase information and magnitude information extracted from the characteristic value of the specific frequency component and torque ripple order information for the torque ripple by performing a Fourier transform on the torque ripple information. The specific frequency component may be determined using the ratio of motor speed to fundamental frequency information and the order information when the torque ripple information is torque ripple information according to time.

Specifically, the compensation factor may be a counter electromotive force constant calculated for each torque component current using the phase information and magnitude information selected based on the current map. However, if the phase information and the magnitude information are determined not to influence the torque component current, the compensation factor may be set to have a constant value regardless of the torque component current.

The motor control method according to an embodiment may include a current control step (S720). For example, the motor control device may generate a control signal corresponding to the calculated input current and input it to the motor. As an example, the motor control device may generate a control signal corresponding to the input current calculated based on the target torque to which the compensation factor according to the torque component current $I_q$ is applied and input the torque ripple-compensated current to the motor. Then, the motor may be driven by the torque ripple-compensated current. Accordingly, the motor control device may calculate an input current based on the torque ripple-compensated target torque, thereby providing an effect of easily compensating for torque ripple. In other words, the motor control device may provide the effect of simply measuring the order information about the torque ripple generated due to the manufacturing variation and performing compensation in a simplified manner without additional equipment.

Further the motor has three phases, and the target torque may be calculated from the torque ripple information measured in a state in which the three phases are electrically shorted.

The motor control method may include other operations according to the present embodiments described in connection with FIGS. 1 to 6.

As described above, according to the present embodiments, there may be provided a motor control device and method capable of compensating for torque ripples generated due to the manufacturing variation in the motor. In particular, there may be provided a motor control device and method capable of compensating for torque ripple by applying a compensation factor calculated from torque ripple information measured in a state in which each phase of the motor is electrically shorted to control current based on the torque ripple-compensated target torque.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A motor control device, comprising:
a current calculator configured to calculate a phase and a magnitude of a torque ripple of a motor measured in a state in which each phase of the motor is electrically shorted, calculate a compensation factor as a counter electromotive force constant determined for each torque component current ($I_q$) using the phase and the magnitude of the torque ripple, determine a torque ripple-compensated target torque using the compensation factor, and calculate an input current based on the target torque of the motor using the compensation factor according to the torque component current ($I_q$); and a current controller configured to generate a control signal corresponding to the input current and inputting the control signal to the motor to control the motor, wherein a specific frequency component for extracting the phase and the magnitude of the torque ripple is determined using a ratio of motor speed to fundamental frequency and a torque ripple order if the torque ripple is torque ripple according to time, wherein the counter electromotive force constant is calculated as a function of a nominal value of the torque ripple, an electrical angle of the motor, and the phase and the magnitude of the torque ripple.

2. The motor control device of claim 1, wherein the torque ripple is measured for each motor speed in a state in which an upper switching element or lower switching element of an inverter connected to each phase of the motor is simultaneously turned on.

3. The motor control device of claim 1, wherein the compensation factor is produced from a current map according to the torque component current ($I_q$) generated based on the phase and the magnitude of the torque ripple.

4. The motor control device of claim 3, wherein the current map is created by matching the phase and the magnitude extracted from the measured torque ripple according to a motor angle or the measured torque ripple according to a measured time to each torque component current.

5. The motor control device of claim 4, wherein the compensation factor is the counter electromotive force constant calculated for each torque component current using the phase and the magnitude selected based on the current map.

6. The motor control device of claim 5, wherein the compensation factor is set to have a constant value regardless of the torque component current if the phase and the magnitude of the torque ripple do not affect the torque component current.

7. The motor control device of claim 4, wherein the phase and the magnitude are extracted from a characteristic value of the specific frequency component and the torque ripple order produced according to a Fourier transform on the torque ripple.

8. The motor control device of claim 1, wherein the motor is a three-phase motor, and
wherein the target torque is determined by applying the compensation factor calculated from the torque ripple measured in a state in which the three phases of the motor are electrically shorted.

9. A motor control method, comprising:
calculating a phase and a magnitude of a torque ripple of a motor measured in a state in which each phase of the motor is electrically shorted;
calculating a compensation factor as a counter electromotive force constant determined for each torque component current ($I_q$) using the phase and the magnitude of the torque ripple;
determining a torque ripple-compensated target torque using the compensation factor;
calculating an input current based on the target torque of the motor using the compensation factor according to the torque component current ($I_q$); and
generating a control signal corresponding to the input current and inputting the control signal to the motor to control the motor, wherein a specific frequency component for extracting the phase and the magnitude of the torque ripple is determined using a ratio of motor speed to fundamental frequency and a torque ripple order if the torque ripple is torque ripple according to time, wherein the counter electromotive force constant is calculated as a function of a nominal value of the torque ripple, an electrical angle of the motor, and the phase and the magnitude of the torque ripple.

10. The motor control method of claim 9, wherein the torque ripple is measured for each motor speed in a state in which an upper switching element or lower switching element of an inverter connected to each phase of the motor is simultaneously turned on.

11. The motor control method of claim 9, wherein the compensation factor is produced from a current map according to the torque component current ($I_q$) generated based on the phase and the magnitude of the torque ripple.

12. The motor control method of claim 11, wherein the current map is created by matching the phase and the magnitude information extracted from the measured torque ripple according to a motor angle or torque ripple information according to a measured time to each torque component current.

13. The motor control method of claim 12, wherein the compensation factor is the counter electromotive force constant calculated for each torque component current using the phase and the magnitude selected based on the current map.

14. The motor control method of claim 13, wherein the compensation factor is set to have a constant value regardless of the torque component current if the phase and the magnitude of the torque ripple do not affect the torque component current.

15. The motor control method of claim 12, wherein the phase and the magnitude are extracted from a characteristic value of the specific frequency component and the torque ripple order produced according to Fourier transform on the torque ripple.

16. The motor control method of claim 9, wherein the motor is a three-phase motor, and
wherein the target torque is determined by applying the compensation factor calculated from the torque ripple measured in a state in which the three phases of the motor are electrically shorted.

* * * * *